United States Patent [19]
Parkinson

[11] Patent Number: 4,561,191
[45] Date of Patent: Dec. 31, 1985

[54] METHOD AND APPARATUS FOR CONTINUOUS FREEZE DRYING

[76] Inventor: Martin C. Parkinson, 6 N. Delaware Dr., Nyack, N.Y. 10960

[21] Appl. No.: 738,378

[22] Filed: May 28, 1985

[51] Int. Cl.[4] .......................... F26B 5/06; F26B 13/30
[52] U.S. Cl. .............................................. 34/5; 34/92
[58] Field of Search ........................................ 34/5, 92

[56] References Cited

U.S. PATENT DOCUMENTS 3,453,741  7/1969  King, III et al. ........................ 34/5
3,516,170  6/1970  Liobis et al. ........................... 34/5 X Primary Examiner—John J. Camby
Attorney, Agent, or Firm—Martin C. Parkinson

[57] ABSTRACT

A method and apparatus for freeze drying heat sensitive aqueous products on a continuous basis, utilizing molecular sieves to sequester the sublimating water vapor, is described. At least two beds of sieve are used sequentially, one being heat regenerated while another is actively adsorbing condensable vapors. Exotherm is controlled during freeze drying, and bed regeneration may be accomplished without the use of a purge gas. The advantages of certain types and sizes of molecular sieves, in a continuous freeze drying procedure, is discussed.

28 Claims, 4 Drawing Figures

FIG.2
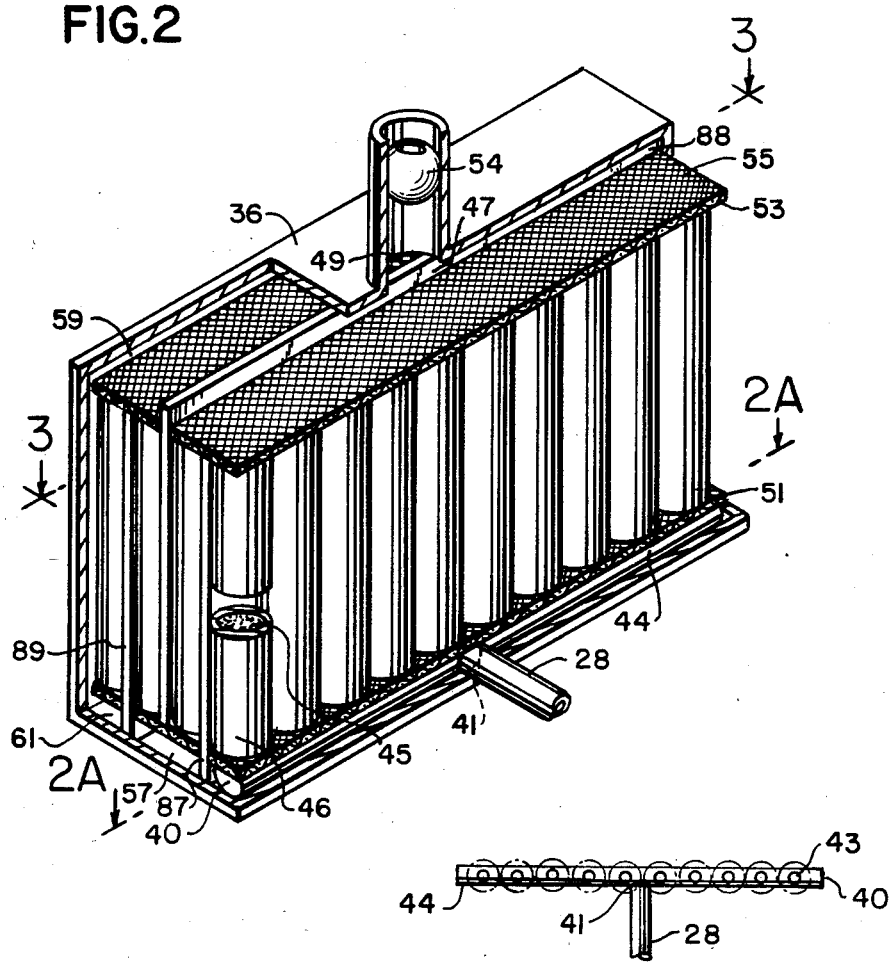
FIG.2A
FIG.3
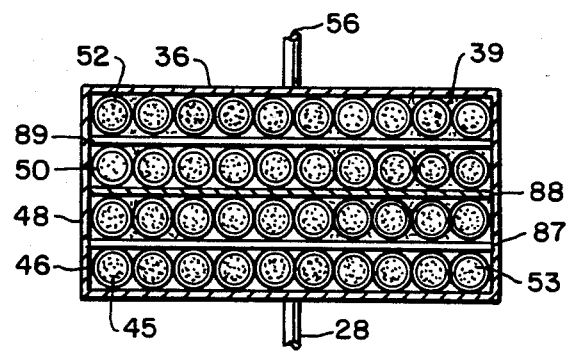

METHOD AND APPARATUS FOR CONTINUOUS FREEZE DRYING

BACKGROUND OF THE INVENTION

This invention relates to a method and apparatus for continuous freeze drying, and more particularly to a method and apparatus utilizing solid chemical desiccants, known as molecular sieves, for this purpose.

Freeze drying is a well established process for drying, and thereby preserving, pharmaceuticals such as antibiotics, vitamin preparations, vaccines, etc. Aqueous products to be dried are first frozen solidly, and are then subjected to a high vacuum and a controlled heat input. Under these conditions the water content of the product goes directly from ice to water vapor, by-passing the intermediary liquid phase. This large quantity of sublimating water vapor cannot be pumped out of the system directly by oil sealed rotary vacuum pumps, since the oil therein will quickly become contaminated by water condensing in the oil, resulting in too high a pressure for satisfactory operation. To prevent this from occurring, a refrigerated condenser, connected between the drying chamber and the vacuum pump, freezes out the water vapor on coils, cold surfaces, etc. Alternatively, a chemical desiccant can be used to sequester the sublimating water vapor.

It would be desirable to have a freeze dry apparatus work on a continuous basis, and a number of such devices have been disclosed as is evident in U.S. Pat. No. 3,516,170 of June 23, 1970.

However, continuous freeze dryers which rely on refrigerants to sequester the sublimating water vapor have certain inherent problems. In order for freeze drying to be a continuous process, at least two water vapor condensers are required. While one is operating to collect water vapor, the second must be defrosted, the water drained therefrom, and then it must be refrigerated again to a low temperature before it is reconnected to the vacuum system. This involves complicated and expensive automated refrigeration and valving equipment. If single stage refrigeration compressors are employed to maintain the condensers at the extremely low temperatures of −40° C. or even substantially lower temperatures these compressors are operating at low efficiency. Often to achieve these low temperatures the compressors are operated at high compression ratios. Under these conditions the compressors are expensive to operate and tend to break down prematurely. Attempts to overcome this problem with cascade refrigeration systems, exotic refrigerants, etc. greatly add to the cost of the original equipment, and add additional operating costs, while often exacerbating the problem of equipment unreliability.

Solid, regenerable chemical desiccants including molecular sieves, have been suggested as a means for sequestering water vapor during freeze drying as is evident from U.S. Pat. No. 3,453,741 of July 8, 1969. Although molecular sieves are high capacity water adsorbing desiccants, and can be repeatedly regenerated, their use in a continuous freeze dryer presents a number of difficulties. Molecular sieves are good insulating materials with heats of adsorption of approximately 1,800 B. T. U.'s per pound of water adsorbed. This means that during a vacuum drying procedure they will heat up rapidly. And as they heat up their ability to adsorb moisture under vacuum conditions rapidly declines.

Also for reasons relating to thermal insulation molecular sieves must be regenerated at high temperatures, normally requiring a heated purge gas to remove the moisture.

And any granular, solid desiccant such as molecular sieves must be packed so that water vapor is efficiently adsorbed and non-adsorbable gases permitted high flow rates through the sieve so that vapor flow restrictions are not so high as to induce melting of the product being freeze dried.

Accordingly it is an object of the invention to provide a practical continuous freeze dryer.

Another object is to provide a simple, efficient, non-refrigerated means for sequestering sublimating water vapor during continuous freeze drying.

Another object of the invention is to provide a continuous molecular sieve freeze dryer.

Another object is to provide a simple means for controlling the exotherm which builds up in the molecular sieve during freeze drying.

A further object is to provide a means for regenerating a molecular sieve in a continuous freeze dryer without using a purge gas.

And finally it is an object of this invention to provide a molecular sieve freeze dryer that can adsorb water vapor at a high rate, and be vacuum evacuated rapidly, so that continuous freeze drying can occur on an efficient basis.

SUMMARY OF THE INVENTION

The above and related objects are obtained in a dual condenser freeze dryer, the condensers containing molecualr sieves to sequester sublimating water vapor on a continuous basis.

Molecualr sieves are broadly defined as crystalline alumino-metal silicates. They have a three-dimensional interconnecting network structure of silica and alumina tetrahydra. Molecular sieves of the type employed in this invention are also known as synthetic zeolites, and it is to these manufactured, synthetic zeolites that this invention relates. They are further characterized by relatively narrow ranges of pore sizes in their "cage like" structures. These pore sizes are generally designated in Angstrom units, and typical commercially available sizes include 3A, 4A, 5A and 13X. Sodium is often the metal used with the alumina tetrahedron to make molecular sieves, and gives rise to the 4A and 13X molecular sieves. By replacing a large amount of the sodium with potassium, molecular sieve 3A is formed, and similarly when calcium is employed molecular sieve 5A is formed. Other specialized molecular sieves are available, such as AW 300 and AW 500. While all of the above mentioned molecular sieves can be used in freeze drying they differ widely in their suitability for this purpose, as will be further discussed.

I find that by using two condensers, each containing a similar quantity of molecular sieve, connected between a drying chamber and a source of vacuum such as, for example, a vacuum pump, a freeze dry apparatus is constructed which is capable of continuous operation with important increases in efficiency and with far greater reliability than was heretofore possible. Means are employed for first connecting one molecular sieve condenser to the drying chamber and a source of vacuum while the second molecular sieve condenser is heated, at atmospheric pressure, to drive off its moisture content. After a period of time the means for heating the molecular sieve is shut off, the condenser is given time to cool down to near ambient temperature, whereupon means are provided for connecting the second condenser between the drying chamber and the source of vacuum, while the first condenser is brought to atmospheric pressure, and is then regenerated by suitable heating means. The apparatus further conforms to the concept of a truly continuous freeze dryer if the drying chamber is of the manifold type, i.e. if the drying chamber is equipped with plurality of externally located valved ports, so that samples frozen in suitable vacuum impervious containers may be connected to, or removed from, the drying chamber without significantly affecting other containers whose contents are undergoing freeze drying at the same time.

BRIEF DESCRIPTION OF THE DRAWINGS

FIG. 2 is a sectional, elevational view of the first condenser structure of the invention.

FIG. 2A is a view of the vapor diffusing tube with the first condenser, taken along the line 2A—2A in FIG. 2, showing the top openings in this tube, the openings communicating with the bases of the first group of the holders shown in phantom.

FIG. 3 is a sectional view of the top of the first condenser structure of the invention, taken along the line 3—3 of FIG. 2.

DESCRIPTION OF THE PREFERRED EMBODIMENT

Figure 1:
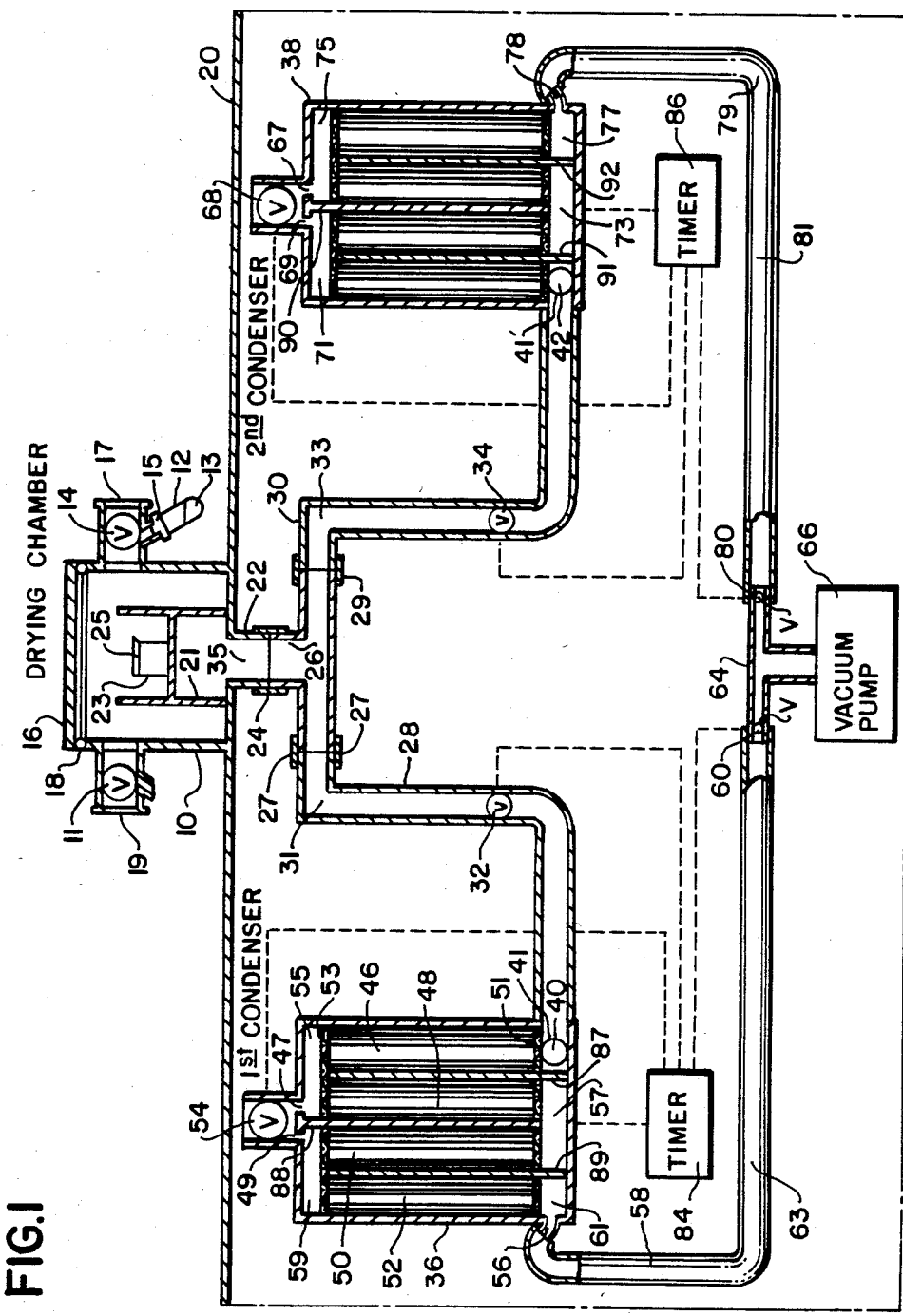
FIG. 1 is a schematic representation of one possible embodiment of the continuous freeze drying apparatus of the invention.

Referring now to FIG. 1, drying chamber 10 is shown in place on table top 20. Plate 16 forms a vacuum tight seal with the drying chamber by means of resilient gasket 18. Two manually operated sample valves 11 and 14 are shown connected to the side walls of the drying chamber. Cap 15 and flask 12 provide a container for frozen sample 13. Within drying chamber 10 is stand 21 which provides a support for container 23 and its frozen contents 25. At the base of the drying chamber, outlet tube 22 is in vacuum tight engagement with resilient coupling 24 and "T" connection 26. On one side "T" connection 26 is in vacuum tight engagement, by means of resilient coupling 27, to vacuum tube 28, and on its other side "T" 26 is in vacuum tight engagement, by means of resilient coupling 29, to vacuum tube 30. Vacuum tube 28 is connected to the base of first condenser 36 and vapor diffusing tube 40, and vacuum tube 30 is connected to the base of second condenser 38 and vapor diffusing tube 42. Valve 32 is within vacuum tube 28 in order to control vapor flow in conduit 31, and valve 34 is within vacuum tube 30 in order to control vapor flow in conduit 33.

Vapor diffusing tube 40 has a centrally located opening 41 (FIGS. 2 and 2A) along its length, and vacuum tube 28 connects at this centrally located opening so that conduit 31 communicates directly with conduit 44 in vapor diffusing tube 40. In turn conduit 44 communicates with the vapor outlets along the periphery of tube 40, such as vapor outlet 43 (FIG. 2A).

Similarly conduit 33 in vacuum tube 30 communicates with a centrally located opening 41′(FIG. 1) along the length of vapor diffusing tube 42 within the second condenser, which in turn communicates with a conduit with tube 42 and the vapor outlets (not shown) along the periphery of tube 42.

FIGS. 1, 2, 2A, and 3 illustrate the placement of the tubular molecular sieve holders, such as holder 46. In the depicted embodiment forty holders are shown in each condenser. Each holder contains a charge of molecular sieve, held in each holder by a bottom screen and a top screen, such as bottom screen 51 and top screen 53. Twenty holders in each condenser are placed on one side of the heating plate, such as heating plate 88 in first condenser 36 and heating plate 90 in second condenser 38, and twenty holders are placed on the other side of the heating plate in each condenser.

Heating plate 88, together with walls 87 and 89 in the first condenser, and heating plate 90, together with walls 91 and 92 in the second condenser, isolate the holders in groups of ten in each condenser. For example, in first condenser 36 the first group of ten holders placed directly above vapor diffusing tube 40 can communicate with the immediately adjacent second group of ten holders only through space 55; these second ten holders in turn can communicate with the third group of ten holders on the other side of heating plate 88 only through space 57; and this third group of ten holders communicates with the fourth group of ten holders only through space 59. Finally conduit 61 provides a connection to the vacuum pump 66 via opening 56 at the base of first condenser 36, which communicates with vacuum tube 58 and conduit 63 to form the connection to vacuum pump 66 by means of "T" connection 64. Similarly the first ten holders directly above vapor diffusing tube 42 in second condenser 38 communicates with the second immediately adjacent group of ten holders via space 71, and in turn this group of ten holders communicates with a third group of ten holders on the opposite side of heating plate 90 by means of space 73; this third group of holders communicates with a fourth group of ten holders by means of space 75. Finally this fourth group of ten holders is connected to the source of vacuum by means of opening 78 in the base of condenser 38, vacuum tube 79 and conduit 81 to "T" connection 64, and vacuum pump 66.

Valve 60 is placed within vacuum tube 58 to provide an onoff vacuum connection between the vacuum pump and the first condenser. Similarly valve 80 is placed within vacuum tube 79 to provide an on-off vacuum connection between the vacuum pump and the second condenser. Valve 54 is centrally located on the top surface of the first condenser, and communicates with openings 49 and 47, which are located at opposite sides of heating plate 88. Valve 54 in its open position permits venting of gases such as water vapor during condenser regeneration periods, and in its closed position it provides a vacuum tight seal for the first condenser during periods when the first condenser is sequestering water vapor and other condensable gases. Similarly valve 68 functions in the same manner with second condenser 38 by providing in its open position condenser openings to atmospheric pressure during regeneration periods by means of openings 69 and 67, and in its closed position a vacuum tight seal of openings 69 and 67 during periods when the second condenser is sequestering condensable vapors. Valves 32, 60, 54, 68, 80, and 34 are solenoid operated "on-off" valves of conventional design. Means for heating heat plates 88 and 90 can be electrical resistance heaters, circulated heating fluid, etc.

To begin the operation, vacuum pump 66 is turned on and remains on for as long as the freeze drying procedure is to continue. During operation timer 84 and timer 86, together with the solenoid valves, provide the automatic control means for the apparatus. The timers 84 and 86 cause the solenoid valves to open and close at appropriate times, and also turn off and on the means for heating the heat plates 88 and 90. At the start of operation timer 84 causes valves 32 and 60 to open, and valve 54 to close. At the same instant of time timer 86 causes valves 34 and 80 to close, valve 68 to open, and turns on the means for heating heat plate 90. A three hour period of time for this first period is considered practical, and this same time period is considered practical for an immediately following second period of time, etc., on a continuous basis.

During this first period of time the vacuum pump quickly removes air and other non-condensable gases from the drying chamber and the first condenser. After a suitable vacuum has been obtained, such as, for example, 100 microns or less, actual freeze drying can commence. A frozen sample, such as sample 13 in flask 12 with cap 15, is connected to the vacuum system of the apparatus by means of manually operated vacuum valve 14. Turning knob 17 on valve 14 provides a vapor path between the interior of drying chamber 10 and the interior of flask 12. Water vapor will now sublime directly from the open surfaces of sample 13, and diffuse into the drying chamber, thence to conduit 35, conduit 31, and opening 41 in vapor diffusing tube 40. The water vapor now diffuses into conduit 44 in a substantially random fashion, and then flows out of the peripheral openings in tube 40, such as opening 43, and migrates up the molecular sieves in the holders, such as molecular sieve 45 in holder 46. As the molecular sieves become saturated in the first group of ten holders, water vapor then diffuses downward into the second group of ten holders, such as holder 48 in this second group, then up into the third group, such as holder 50 in this third group, and finally downward into the fourth group of holders, such as holder 52 in this fourth group.

During freeze drying additional flasks can be connected to additional sample valves, such as valve 11, and connected to the vacuum system by turning knob 19 to its open position, and samples, when dry, can be removed, for example by turning knob 17 on sample valve 14 to its closed position, and the now dried sample 13 in flask 12 can be removed and replaced with a new frozen sample, which in turn can be connected to the vacuum system of the apparatus by turning knob 17 on valve 14 to its closed position.

Thus during this first period of time sublimating water vapor is sequestered in the first group of ten holders in the first condenser, then the second group of ten holders, then the third group of ten holders, and finally the fourth group of ten holders. During the first half of this same time period the molecular sieves within the forty holders in second condenser 38 are heated, and thereby regenerated as the water content within the molecular sieves is driven out of the sieves, and is permitted to vent to the atmosphere through openings 69 and 67. Then timer 86 turns off the means for heating heat plate 90, and the molecular sieves are allowed to cool down for the remainder of this first time period.

At the beginning of a second period of time immediately following this first period, timer 86 causes valves 34 and 80 to open, and valve 68 to close. At the same instant of time as the beginning of this second period, timer 84 causes valves 32 and 60 to close, valve 54 to open, and turns of the means for heating heat plate 88. Sublimating water vapor now diffuses through conduit 35, to conduit 33, through opening 41' into vapor diffusing tube 42 in second condenser 38, then on out of identical peripheral openings in tube 42 as is shown in tube 40 of FIG. 2A. The diffusing water vapor will then be sequestered initially in the first group of ten holders in the second condenser, then the water vapor gradually diffuses into the second group of ten holders, then the third, and finally the fourth group of ten holders.

During the first half of this second period of time the molecular sieves within the forty holders in first condenser 36 are heated, and thereby regenerated, as the water content within the molecular sieves is driven out of the sieves, and is permitted to vent to the atmosphere through openings 49 and 47. Then timer 84 turns off the means for heating heat plate 88, and the molecular sieves are allowed to cool down for the remainder of this second period of time.

At the beginning of a third period of time immediately following this second period of time, timer 84 cuases valves 32 and 60 to open, and valve 54 to close. At the same instant of time as the beginning of this third period, timer 86 causes valves 34 and 80 to close, valve 68 to open, and turns on means for heating heat plate 90 in second condenser 38.

Thus it can be seen that frozen samples can be introduced, dried samples removed, and sublimating water vapor sequestered over a prolonged period of time, and on a continuous basis.

It should be noted that the freeze dry apparatus of FIG. 1 and the condenser design depicted in FIGS. 2 and 3 are not drawn to scale for the sake of clarity in illustrating the correct operation of the apparatus and its components. However, certain dimensions and materials of construction are important so that the exotherm in the molecular sieves is controlled during sequestering time periods, and good heat transfer is maintained during regenerating time periods.

The holders in both condensers, such as holder 46, should be fabricated in metal such as aluminum, and preferably copper. Also walls 87, 89, 72, 74, and heat plates 88 and 90 should be made of metals such as aluminum, and preferably copper, in both condensers. To improve heat transfer, the spaces between the holders are packed with a heat transfer material, such as copper wool 39 (FIG. 3). The outer walls of condenser 36 and 38 should also be metal, such as stainless steel, aluminum, or copper. In this manner the 1,800 B. T. U. heat load per pound of water adsorbed by the sieves may be largely conducted away from the sieve while the sieves are under vacuum, so that the sieves do not heat up excessively and thereby lose significant water retaining capacity.

And during periods of regeneration, good thermal contact with the molecular sieves is essential if the sieves are to be regenerated without the use of a purge gas.

For example, forty holders such as holder 46, each holder being fabricated in copper measuring 6" in length by 1" I. D. by 1/16" wall thickness, and containing forty grams of molecular sieve per holder, sequester 160 grams of water in a three hour freeze drying time period. Then regenerating the sieves by heating them to 200° C. in the first half hour of regeneration period, and then continuing to heat the sieves to a maximum temperature of 250° C. at the end of a one and one half hour regeneration period, and then allowing the sieves to cool down for another one and a half hour time period, places the sieves in condition to again sequester 160 grams of water in a second three hour freeze drying time period, and so on, on a continuous basis. Heat plate 88 and 90 are maintained at a temperature of approximately 340° C. for most of one and one half hour heating cycles.

Holders in excess of 2" in width are too wide to permit adequate control of exothermic heating during freeze drying. And holders with an optimum 1" I.D., but in excess of ten inches in length, do not permit efficient regeneration of the molecular sieves without the use of a purge gas.

In order for efficient freeze drying to occur it is necessary that the proper type of molecular sieve be employed, and that it is supplied in a suitable shape. For example, most commerically available molecular sieves are supplied in either powder form, or formed in 4×8 or 8×12 mesh beads, or formed in 1/16" or $\frac{1}{8}$" diameter pellets. I have found that only the $\frac{1}{8}$" diameter pellets are routinely satisfactory in freeze drying by presenting sufficiently low impedance to the flow of water vapor. For example, a 92.3 gram sample of molecular sieve Type 5A in the 4×8 mesh, contained in a one foot by one inch copper tube, when connected between a freeze dry flask containing 120 ml. of ice, and a 25 liter/minute two stage vacuum pump, caused the ice to melt back in 25 minutes. Melt back of the ice did not occur in a similar experiment when Type 5A molecular sieve in the $\frac{1}{8}$" pellet size was substituted. Again with 100 grams of molecular sieve Type 4A in the 1/16" pellet size, contained in a one foot by one inch copper tube, and connected between a freeze dry flask containing 120 ml. of ice, and a 25 liter/minute two stage vacuum pump, melt back of the ice occurred in 17 minutes. A similar experiment did not result in ice melt back when Type 4A molecular sieve in the $\frac{1}{8}$" pellet size was substituted.

The various types of commercially available molecular sieves also vary widely in their suitability for use in a continuous freeze dryer. For example, approximately 90 grams of new Type 13X adsorbs as much as 11.5 grams of water when placed in a one foot by one inch copper tube, and is then connected between a freeze dry flask containing 120 ml. of ice and a two stage vacuum pump. When this same Type 13X has been regenerated approximately 50 times at a maximum temperature of 250° C. it will only adsorb 5.2 grams of water in a similar experiment. This loss of capacity is probably related to changes in crystalline structure after repeated regenerations.

In a similar experiment using approximately the same quantity of new Type 5A molecular sieve, this sieve was found to adsorb 5.6 grams of water.

In a similar experiment using approximately the same quantity of new Type AW 500 molecular sieve, this sieve was found to adsorb 4.4 grams of water.

Another important aspect of continuous freeze drying with molecular sieves is their ability to permit obtaining a good vacuum of 100 microns or less rapidly enough to be useful. In the case of molecular sieve Type AW 300, for example, a 100 gram sample of new Type AW 300, contained within a one foot by one inch copper tube, was evacuated to only 550 microns in a 15 minute period, using a 25 liter/minute two stage vacuum pump. For this reason Type AW 300 would be considered unsuitable for continuous freeze drying. In a similar experiment using approximately the same quantity of new Type 4A, a vacuum of 200 microns was obtained after 9 minutes, making the performance of this molecular sieve marginal for continuous freeze drying.

Another important aspect of continuous freeze drying with molecular sieves is the concept of a "mass transfer zone". This is the length of the molecular sieve bed through which condensable vapors are sequestered and remain substantially undetectable at the outlet end of the sieve bed. This means that there are specific lengths of sieve bed that must be used to obtain good adsorption efficiencies of the order of 10% to 15% condensable adsorption rates. For example, in the pervious example given for new Type 13X, efficiency in a one foot long bed is seen to be in excess of 10%. In a similar experiment, but using 35 grams of new Type 13X in a six inch long by one inch copper tube, the condensable adsorption efficiency dropped to less than 2%.

Type 3A molecular sieve offers advantages over other commercially available molecular sieves such as Type 4A, 5A, 13X, AW 300, and AW 500. When 90 grams of Type 3A is placed in a one foot by one inch copper tube, and is connected between a freeze dry flask containing 120 ml. of ice, and a 25 liter/minute two stage vacuum pump, the condensable adsorption efficiency is of the order 10% or more. And initial evacuation of gases is extremely efficient, in the above experiment yielding a vacuum of 100 microns in less than one minute. When 200 grams of Type 3A molecular sieve is contained in a two foot by one inch copper tube, and is connected between a freeze dry flask containing 120 ml. of ice, and a 25 liter/minute two stage vacuum pump, condensable adsorption efficiency is increased to approximately 15%. And repeated regeneration of Type 3A at a maximum temperature of 250° C. does not diminish the water adsorption efficiency of this desiccant.

While the present invention has been disclosed in connection with the preferred embodiments shown and described in detail, various modifications and improvements thereon will become readily apparent to those skilled in the art. Accordingly, the spirit and scope of the present invention is to be limited only by the following claims.

I claim:
1. A freeze drying apparatus, comprising:
   (A) A drying chamber means;
   (B) At least two condenser means;
   (C) A quantity of molecular sieve within each of said condenser means;
   (D) A vacuum pump;
   (E) Valving means for providing vacuum tight communication sequentially between each of said condenser means and said drying chamber means and said vacuum pump, and for opening each of said condenser means sequentially to atmospheric pressure; and
   (F) Automatic control means for opening and closing valve positions in said valving means, so that during a first period of time when said vacuum pump is in operation said atmospheric pressure is reduced within said drying chamber means and the first of said condenser means, while a second condenser means is opened to said atmospheric pressure, said automatic control means further providing means for heating said molecular sieve within said second condenser means, so that vapors that have previously been adsorbed by said sieve within said sec- ond condenser means are driven out of said sieve in said second condenser means, and are expelled to the atmosphere through said opening to said atmospheric pressure in said second condenser means, said automatic control means further providing means for turning off said heating means for said sieve within said second condenser means in order to permit said sieve within said second condenser means to cool down, said automatic control means further providing, during a second period of time immediately following said first period of time, means for opening and closing valve positions in said valving means, so that when said vacuum pump is in operation, said pressure is continued to be reduced in said drying chamber, and said atmospheric pressure is reduced in said second condenser means, while said first condenser means is opened to said atmospheric pressure, said automatic control means further providing a means for heating said molecular sieve within said first condenser, so that condensable vapors that have previously been adsorbed by said sieve within said first condenser are driven out of said sieve within said first condenser, and are expelled to said atmosphere through said opening to said atmospheric pressure in said first condenser, said automatic control means further providing means for turning off said heating means for said sieve within said first condenser in order to permit said sieve within said first condenser to cool down, and then repeating, during a third period of time, the operations that occurred during said first period of time, and so on, so that adsorbable vapors diffusing from said drying chamber means are adsorbed by said molecular sieve in said condenser means on a continuous basis.

2. A freeze dry apparatus according to claim 1 wherein said drying chamber means is a manifold means.

3. A freeze dry apparatus according to claim 1 wherein said molecular sieve within said condenser means is contained in a plurality of metal holders, so that particles comprising said molecular sieve are at a maximum distance of one inch from an internal surface of said metal holders, the external surfaces of said holders having thermal contact means for providing heat transfer away from said molecular sieve, so that excessive endothermic heat build-up during freeze drying is prevented.

4. A freeze dry apparatus according to claim 3 wherein the height of each of said metal holders is no greater than ten inches, so that when said molecular sieve in said holders is heated by said heating means said condensable vapors are expelled to said atmosphere without the use of a purge gas.

5. A freeze dry apparatus according to claim 4 wherein said metal holders are fabricated in copper.

6. A freeze dry apparatus according to claim 3 wherein said vapors diffusing from said drying chamber gain entrance to each of said condenser means through an opening in each of the external surfaces of said condenser means, said opening communicating with a vapor diffusing tube containing a centrally located opening along its length, there being at least one of said vapor diffusing tubes in each of said condenser means, said vapor diffusing tube having a plurality of openings along its periphery; at least one of said peripheral openings communicating with the bottom opening of one of said metal holders, so that said vapors enter the bottom openings of a plurality of said holders in a random manner.

7. A freeze dry apparatus according to claim 3 wherein said vapors diffusing from said drying chamber means enter said condenser means, and then enter one end of the first member of a pair of said holders, and as the adsorption process goes on said vapors leave the other end of said first member, which in turn communicates with one end of the second member of said pair of said holders, through which said vapors migrate to the other end of said second member, so that said vapors migrate through a mass transfer zone at least ten inches in length.

8. A freeze dry apparatus according to claim 7 wherein said vapors migrate through a mass transfer zone of at least twenty inches in length.

9. A freeze dry apparatus according to claim 1 wherein said molecular sieve exists in the form of $\frac{1}{8}$ inch diameter pellets.

10. A freeze dry apparatus according to claim 3 wherein said molecular sieve exists in the form of $\frac{1}{8}$ inch diameter pellets.

11. A freeze dry apparatus according to claim 4 wherein said molecular sieve exists in the form of $\frac{1}{8}$ inch diameter pellets.

12. A freeze dry apparatus according to claim 1 wherein said molecular sieve is a molecular sieve selected from the group consisting of Type 3A and Type 4A.

13. A freeze dry apparatus according to claim 3 wherein said molecular sieve is a molecular sieve selected from the group consisting of Type 3A and Type 4A.

14. A freeze dry apparatus according to claim 4 wherein said molecular sieve is a molecular sieve selected from the group consisting of Type 3A and Type 4A.

15. A freeze dry apparatus according to claim 9 wherein said molecular sieve is a molecular sieve selected from the group consisting of Type 3A and Type 4A.

16. A freeze dry apparatus according to claim 10 wherein said molecular sieve is a molecular sieve selected from the group consisting of Type 3A and Type 4A.

17. A freeze dry apparatus according to claim 11 wherein said molecular sieve is a molecular sieve selected from the group consisting of Type 3A and Type 4A.

18. A freeze dry apparatus according to claim 1 wherein said molecular sieve is Type 3A.

19. A freeze dry apparatus according to claim 3 wherein said molecular sieve is Type 3A.

20. A freeze dry apparatus according to claim 4 wherein said molecular sieve is Type 3A.

21. A freeze dry apparatus according to claim 9 wherein said molecular sieve is Type 3A.

22. A freeze dry apparatus according to claim 10 wherein said molecular sieve is Type 3A.

23. A freeze dry apparatus according to claim 11 wherein said molecular sieve is Type 3A.

24. A method for freeze drying heat sensitive materials on a continuous basis, which comprises the steps of:
(A) Placing frozen samples within a drying chamber means;
(B) Filling a plurality of condensing means with molecular sieve;

(C) Connecting said drying chamber means in vacuum tight engagement sequentially with said condensing means;

(D) Providing a source of vacuum for said drying chamber means and said condensing means;

(E) Reducing the pressure in said drying chamber means and in a first condensing means of said plurality of condensing means, while a second condensing means of said plurality of condensing means is at atmospheric pressure by means for opening a valve-to-atmosphere in said second condensing means;

(F) Heating said molecular sieve in said second condensing means so that condensable vapors within said molecular sieve in said second condensing means are driven off and expelled to said atmosphere by said valve-to-atmosphere means in said second condensing means;

(G) Turning off said heating of said molecular sieve in said second condensing means after said vapors in said molecular sieve in said second condensing means are expelled to said atmosphere;

(H) Permitting said molecular sieve in said second condensing means to cool down;

(I) Using means for closing said valve-to-atmosphere in said second condensing means;

(J) Connecting said second condensing means to said drying chamber means and said source of vacuum, while simultaneously raising the pressure to said atmospheric pressure by means for opening a valve-to-atmosphere in said first condensing means;

(K) Heating said molecular sieve is said first condensing means so that condensable vapors within said molecular sieve in said first condensing means are driven off and expelled to said atmosphere by means of said valve-to-atmosphere in said first condensing means;

(L) Turning off said heating of said molecular sieve in said first condensing means after said vapors in said molecular sieve in said first condensing means are expelled to said atmosphere;

(M) Permitting said molecular sieve in said first condensing means to cool down;

(N) Using means for closing said valve-to-atmosphere in said first condensing means;

(O) Connecting said first condensing means to said drying chamber means and said source of vacuum, while simultaneously raising the pressure to said atmospheric pressure by means for opening a valve-to-atmosphere in said second condensing means; and (P) Repeating the steps of (F), (G), (H), and (I), and so on, so that condensable vapors eminating from said frozen samples within said drying chamber means are sequestered by said molecular sieve in said condensing means on a continuous basis.

25. The method as recited in claim 24, further comprising the step of filling said condensing means with molecular sieve wherein said molecular sieve is a molecular sieve selected from the group consisting of Type 3A and 4A.

26. The method as recited in claim 25, further comprising the step of filling said condensing means with molecular sieve selected from the group consisting of Type 3A and 4A, wherein said group of molecular sieves is in the form of ⅛ inch diameter pellets.

27. The method as recited in claim 24, further comprising the step of filling said condensing means with molecular sieve Type 3A.

28. The method as recited in claim 27, further comprising the step of filling said condensing means with molecular sieve Type 3A, wherein said molecular sieve is in the form of ⅛ inch diameter pellets.

* * * * *